United States Patent
Huang et al.

(10) Patent No.: US 9,847,521 B2
(45) Date of Patent: Dec. 19, 2017

(54) CONDUCTIVE PLATE AND AN ELECTRONIC DEVICE HAVING THE SAME

(71) Applicant: BIONIME CORPORATION, Taichung (TW)

(72) Inventors: Chun-Mu Huang, Taichung (TW); Chieh-Hsing Chen, Taichung (TW); Hsi-Wen Huang, Taichung (TW)

(73) Assignee: Bionime Corporation, Taichung (TW)

( * ) Notice: Subject to any disclaimer, the term of this patent is extended or adjusted under 35 U.S.C. 154(b) by 155 days.

(21) Appl. No.: 14/755,503

(22) Filed: Jun. 30, 2015

(65) Prior Publication Data

US 2015/0303432 A1 Oct. 22, 2015

Related U.S. Application Data

(63) Continuation-in-part of application No. 13/890,913, filed on May 9, 2013, now abandoned.

(30) Foreign Application Priority Data

Dec. 25, 2012 (CN) .................... 2012 2 0724073 U

(51) Int. Cl.
*H01M 2/20* (2006.01)
*H01M 10/04* (2006.01)
*H01M 2/10* (2006.01)
*H01R 13/24* (2006.01)

(52) U.S. Cl.
CPC ......... *H01M 2/204* (2013.01); *H01M 2/1044* (2013.01); *H01M 2/202* (2013.01); *H01M 10/0427* (2013.01); *H01M 10/0436* (2013.01); *H01R 13/2435* (2013.01); *H01M 2220/30* (2013.01); *H01R 2201/12* (2013.01)

(58) Field of Classification Search
CPC .... H01M 2/204; H01M 2/1044; H01M 2/202; H01M 10/0427; H01M 10/0436; H01M 2220/30; H01R 13/2435
See application file for complete search history.

(56) References Cited

U.S. PATENT DOCUMENTS

| | | |
|---|---|---|
| 2,449,568 A | 9/1948 | Shriro et al. |
| 2,947,914 A | 8/1960 | Simons |
| 3,419,844 A | 12/1968 | Schmued |
| 3,880,673 A | 4/1975 | Buhrer |
| 3,881,799 A | 5/1975 | Elliott et al. |
| 3,992,227 A | 11/1976 | Persson |
| 4,329,780 A | 5/1982 | Somers |
| 4,516,820 A | 5/1985 | Kuzma |

(Continued)

*Primary Examiner* — Jonathan Jelsma
(74) *Attorney, Agent, or Firm* — Kirton McConkie; Evan R. Witt

(57) ABSTRACT

An electronic device includes a casing, first and second batteries and a conductive plate. The first and second batteries are disposed in a battery slot of the casing. The conductive plate is clamped between the first and second batteries, and has a mounting portion that is mounted pivotally into a mounting groove of the casing such that the conductive plate is pivotable between a clamped position where a conductive body of the conductive plate is clamped between the first and second batteries, and an unclamped position where the conductive body is spaced apart from the first and second batteries for removal and installment of one of the first and second batteries.

4 Claims, 11 Drawing Sheets

(56) References Cited

U.S. PATENT DOCUMENTS

| | | | |
|---|---|---|---|
| 4,526,432 A | | 7/1985 | Cronin et al. |
| 5,059,143 A | | 10/1991 | Grabbe |
| 5,169,733 A | | 12/1992 | Savovic et al. |
| 5,346,786 A | | 9/1994 | Hodgetts |
| 5,378,552 A | | 1/1995 | Dixon |
| 5,473,521 A | * | 12/1995 | Minshall .............. F21V 23/04 200/60 |
| 5,795,675 A | | 8/1998 | Maglica |
| 5,865,638 A | | 2/1999 | Trafton |
| 6,068,947 A | * | 5/2000 | Tuttle .............. H01M 2/1044 429/157 |
| 6,589,059 B2 | | 7/2003 | Perino et al. |
| 7,097,519 B2 | | 8/2006 | Mattejat et al. |
| 7,229,296 B2 | | 6/2007 | Pillet |
| 8,092,129 B2 | | 1/2012 | Wiley et al. |
| 8,287,313 B2 | | 10/2012 | Kwon et al. |
| 8,303,357 B2 | | 11/2012 | Kuwahara et al. |
| 8,871,375 B2 | | 10/2014 | Lim |
| 2003/0124902 A1 | * | 7/2003 | Wu .............. H01R 13/2457 439/500 |
| 2006/0250790 A1 | * | 11/2006 | Mah .............. F21L 4/027 362/157 |

\* cited by examiner

CONDUCTIVE PLATE AND AN ELECTRONIC DEVICE HAVING THE SAME

CROSS-REFERENCE TO RELATED APPLICATION

This application is a continuation-in-part (CIP) of co-pending U.S. patent application Ser. No. 13/890,913, filed on May 9, 2013, which claims priority of Chinese Application No. 201220724073.1, filed on Dec. 25, 2012.

FIELD

The disclosure relates to an electronic device, more particularly to an electronic device having a conductive plate.

BACKGROUND

Generally, batteries for a conventional electronic device are directly connected in series between a pair of conductive terminals to obtain a desired voltage. However, due to dust accumulation on electrodes of the batteries, or elastic fatigue of the conductive terminals, the power provided by the batteries may become unstable.

SUMMARY

Therefore, the object of the disclosure is to provide an electronic device that can overcome at least one of the aforesaid drawbacks associated with the prior art.

According to the disclosure, the electronic device includes a casing, positive and negative power output terminals, first and second batteries and a conductive plate. The casing is formed with a battery slot, and has a mounting groove that is formed in an inner surrounding surface of the casing defining the battery slot. The positive and negative power output terminals project into the battery slot. The first and second batteries are removably disposed in the battery slot, and each has a first electrode end and a second electrode end. The conductive plate is clamped removably between the first and second batteries, and has a conductive body and a mounting portion that extends from the conductive body. The first battery, the conductive plate and the second battery are arranged along an extending direction of the battery slot. The first electrode end of the first battery is connected electrically to the first electrode end of the second battery via the conductive plate. The second electrode ends of the first and second batteries are connected electrically and respectively to the positive and negative power output terminals. The conductive body of the conductive plate has at least one contact for contact with one of the first electrode ends of the first and second batteries. The mounting portion of the conductive plate is mounted pivotally into the mounting groove of the casing such that the conductive plate is pivotable relative to the casing between a clamped position where the conductive body is clamped between the first and second batteries, and an unclamped position where one of the first and second batteries is removed from the battery slot and where the conductive body is spaced apart from the other one of the first and second batteries for removal and installment of the other one of the first and second batteries.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
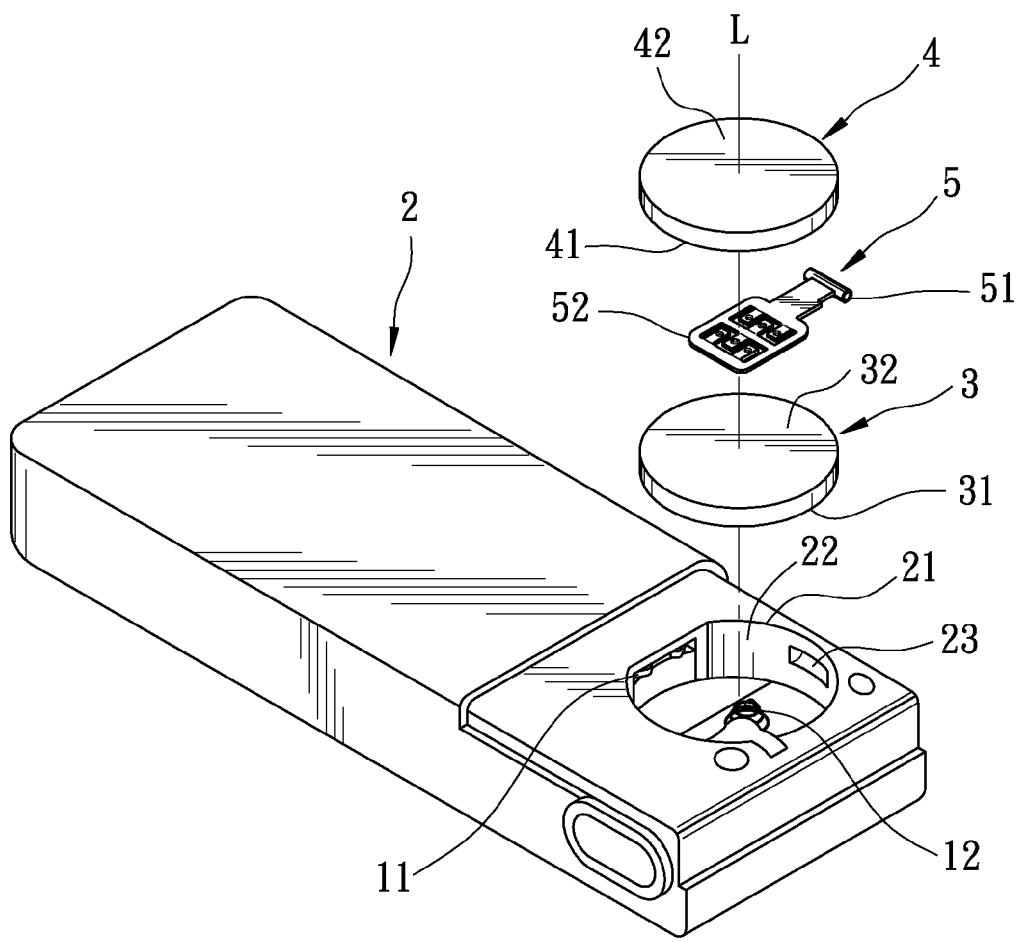
FIG. 1 is a partly exploded perspective view of an embodiment of an electronic device according to the disclosure.
Figure 2:
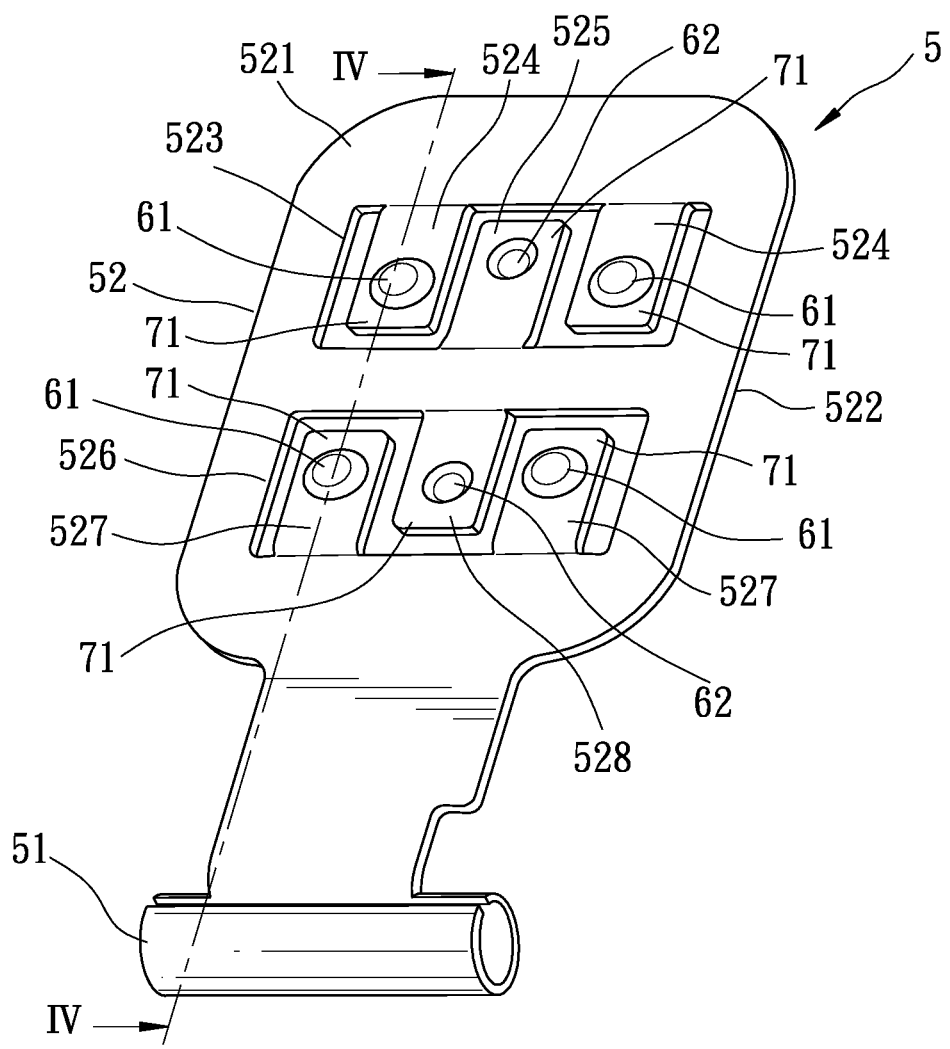
FIG. 2 is a perspective view of a conductive plate of the embodiment.
Figure 3:
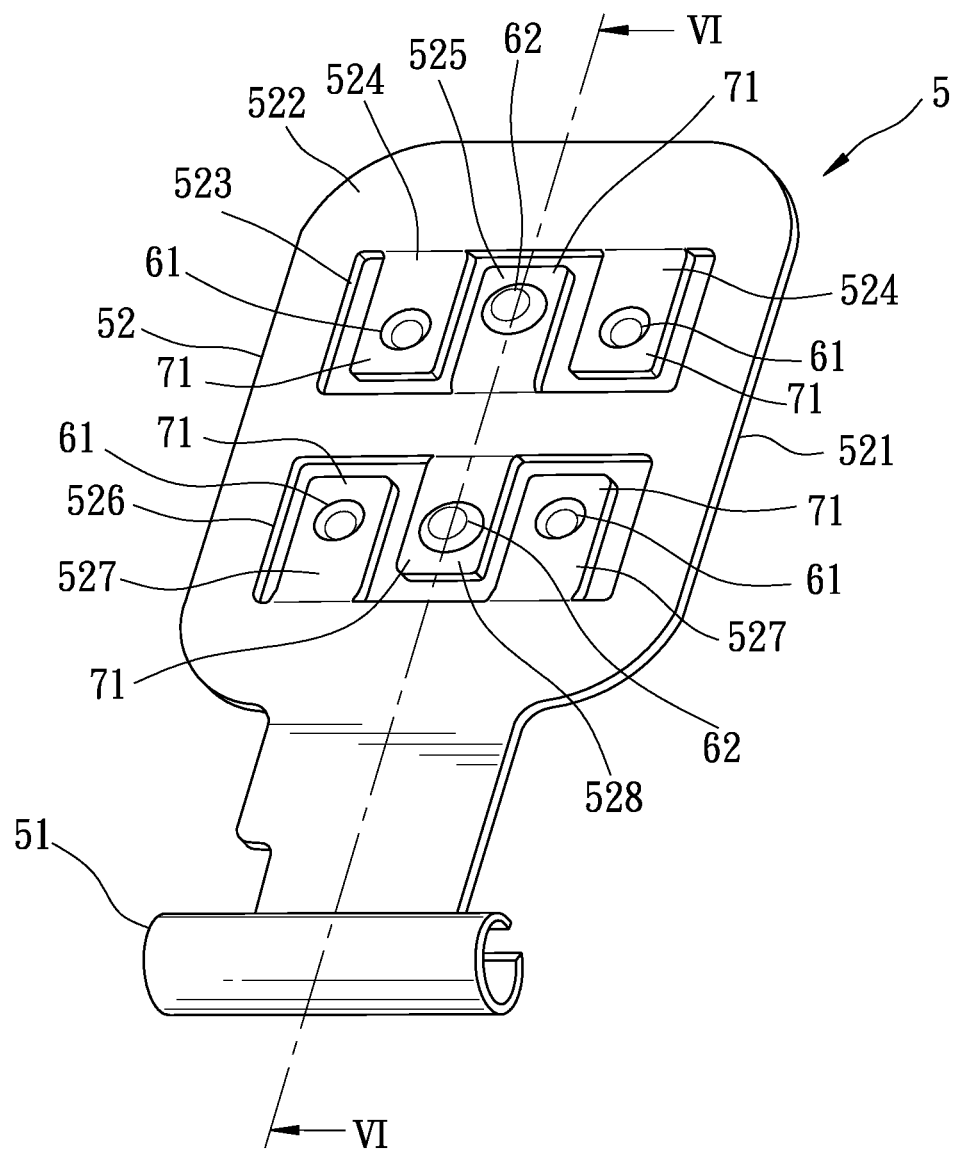
FIG. 3 is another perspective view of the conductive plate of the embodiment.
Figure 4:
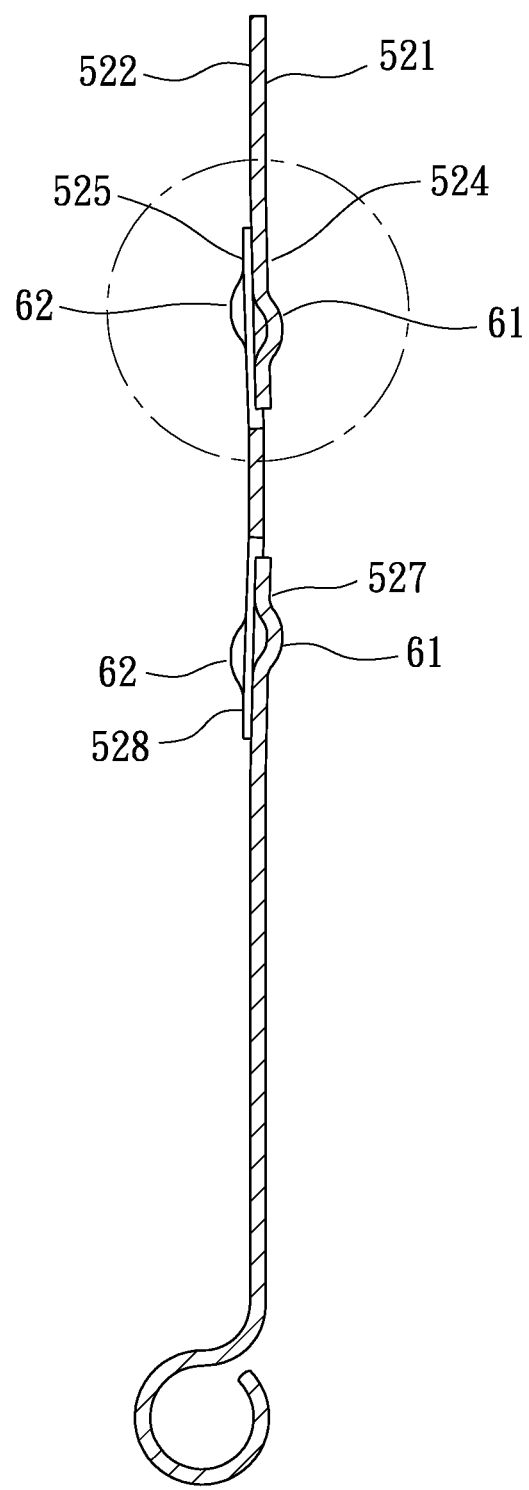
FIG. 4 is a sectional view of the conductive plate of the embodiment taken along line IV-IV in FIG. 2.
Figure 5:
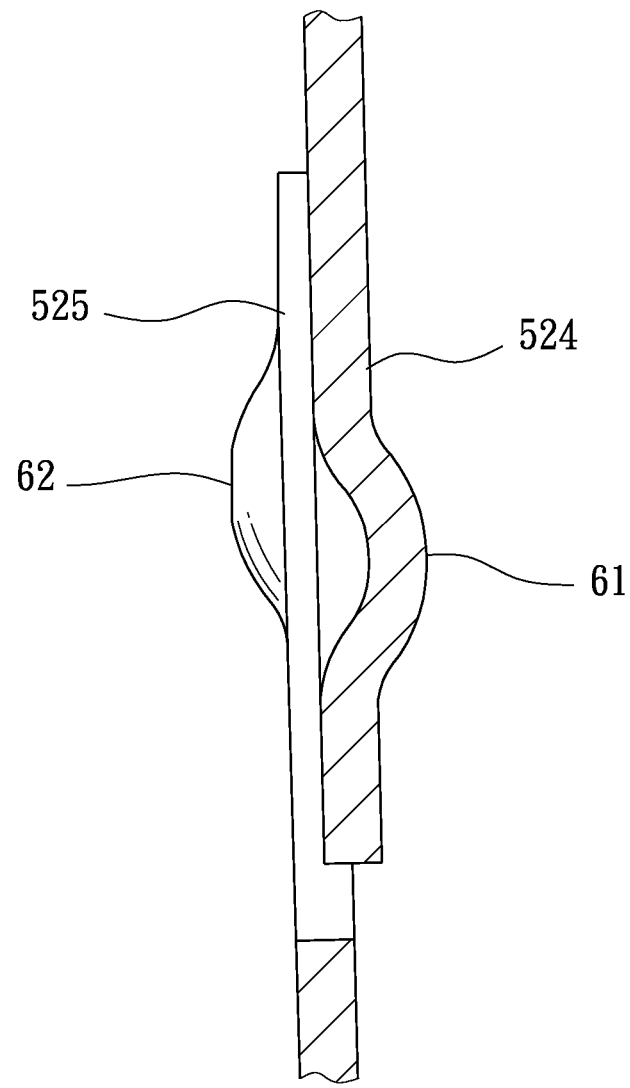
FIG. 5 is a fragmentary enlarged sectional view of the conductive plate of the embodiment.
Figure 6:
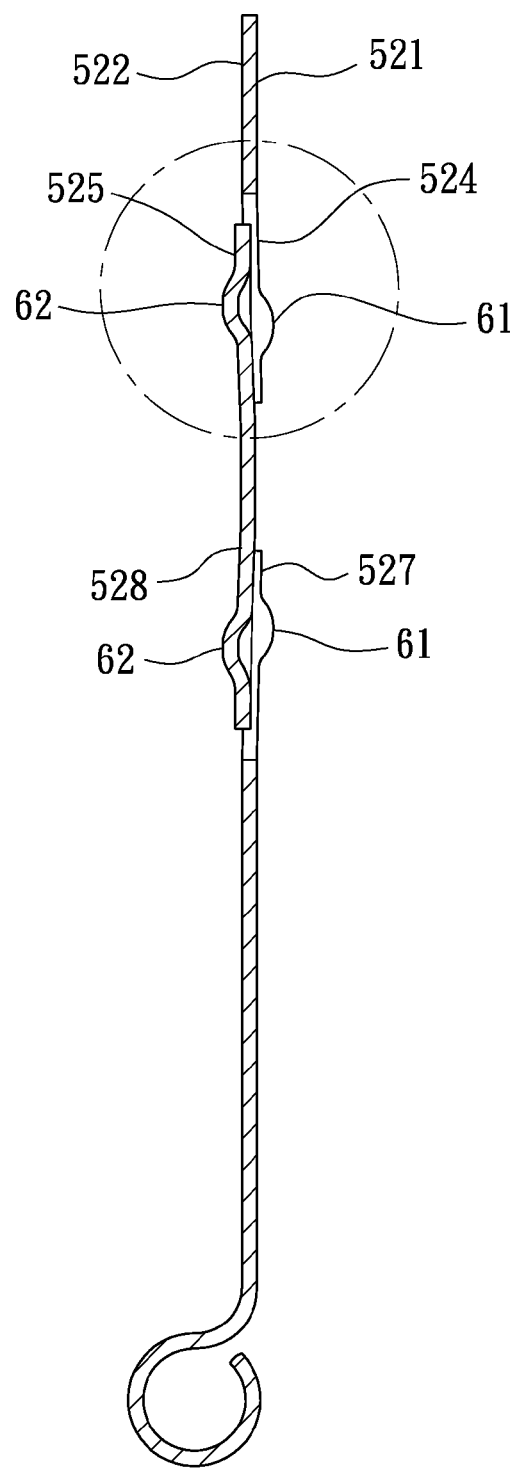
FIG. 6 is another sectional view of the conductive plate of the embodiment taken along line VI-VI in FIG. 3.
Figure 7:
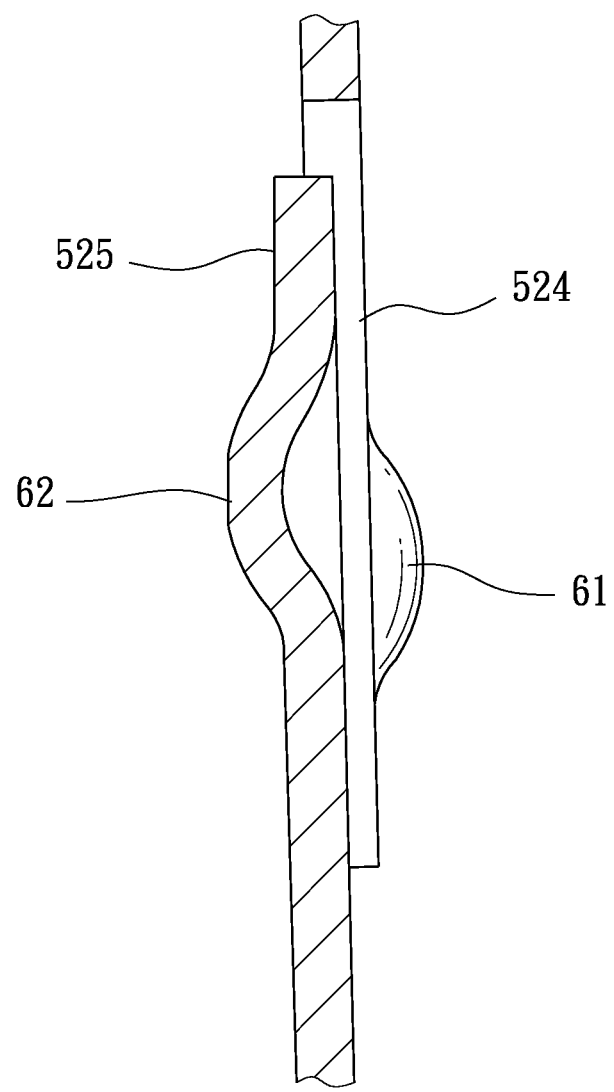
FIG. 7 is another fragmentary enlarged sectional view of the conductive plate of the embodiment.

As shown in FIGS. 1 to 3, an embodiment of an electronic device according to the disclosure is exemplified as a blood glucose meter, but may be other electronic devices. The electronic device includes a casing 2 that is formed with a battery slot 21, a first battery 3 that is removably disposed in the battery slot 21, a second battery 4 that is removably disposed in the battery slot 21 and that is stacked with the first battery 3, positive and negative power output terminals 11, 12 that project into the battery slot 21, and a conductive plate 5. The battery slot 21 extends along an axis (L). The first battery 3 has a first electrode end 32 connected electrically to a first electrode end 41 of the second battery 4. Second electrode ends 31, 42 of the first and second batteries 3, 4 are connected electrically and respectively to the negative and positive power output terminals 12, 11. In this embodiment, the first and second batteries 3, 4 are configured to be button battery cells. Each of the button cells has a top surface and an annular lateral surface that cooperatively serve as a positive terminal (i.e., the first electrode end 32 and the second electrode end 42), and a bottom surface that serves as a negative terminal (i.e., the second electrode end 31 and the first electrode end 41). However, the first and second batteries 3, 4 may be configured to be other type of batteries, for instance, AAA, D, C, AA, N or square.

The conductive plate 5 includes a conductive body 52 that is clamped removably between the first electrode ends 32, 41 of the first and second batteries 3, 4, and a mounting portion 51 that extends from the conductive body 52. The first battery 3, the conductive plate 5 and the second battery 4 are arranged along the direction of the axis (L).

The casing 2 further has a mounting groove 23 formed in an inner surrounding surface 22 of the casing 2 that defines the battery slot 21. The mounting portion 51 of the conductive plate 5 is mounted pivotally into the mounting groove 23 of the casing 2.

The conductive body 52 has a first surface 521 that faces the first battery 3, a second surface 522 that is opposite to the first surface 521 and that faces the second battery 4, a first through groove 523 that extends through the first and second surfaces 521, 522, a pair of spaced-apart resilient first tongue 524 that are disposed in the first through groove 523, a resilient second tongue 525 that is disposed in the first through groove 523 between the first tongues 524, a second through groove 526 that extends through the first and second surfaces 521, 522 and that is spaced apart from the first through groove 523, a pair of spaced-apart resilient third tongues 527 that are disposed in the second through groove 526, and a resilient fourth tongue 528 that is disposed in the second through groove 526 between the third tongues 527. Each of the first tongues 524 has a free end 71 and a fixed end opposite to the free end 71 and connected fixedly to an edge surrounding the first through groove 523. The second tongue 525 has a free end 71 and a fixed end opposite to the free end 71 and connected fixedly to the edge surrounding the first through groove 523. Each of the third tongues 527 has a free end 71 and a fixed end opposite to the free end 71 and connected fixedly to an edge surrounding the second through groove 526. The fourth tongue 528 has a free end 71 and a fixed end opposite to the free end 71 and connected fixedly to the edge surrounding the second through groove 526. Each of the first tongues 524 and the third tongues 527 defines apart of the first surface 521, each of the second tongue 525 and the fourth tongue 528 defines a part of the second surface 522.

Figure 11:
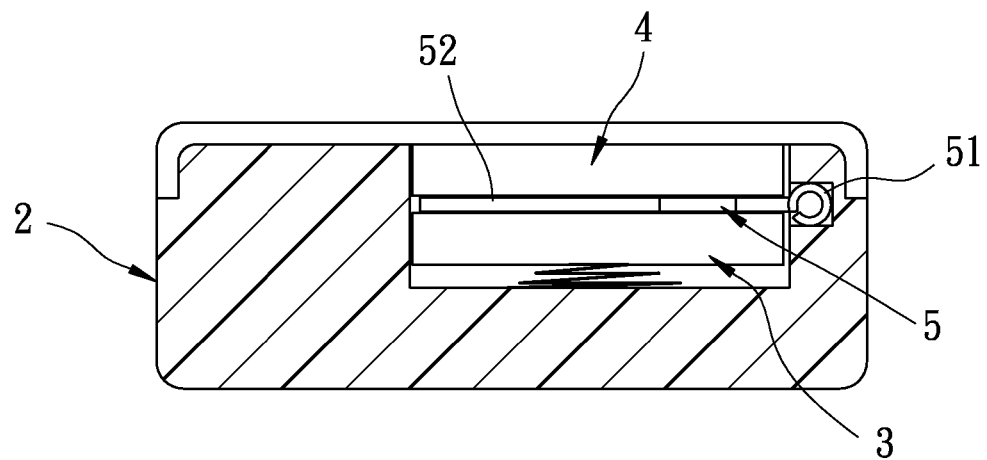
FIG. 11 is a schematic sectional view of the embodiment, illustrating the conductive plate at a clamped position.
Figure 12:
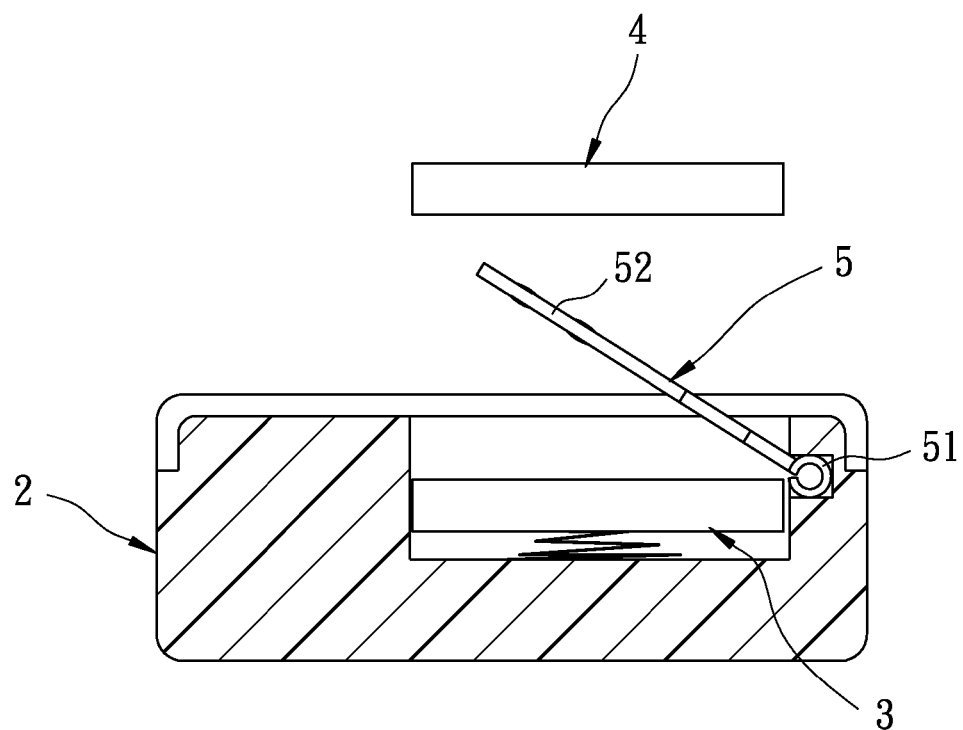
FIG. 12 is another schematic sectional view of the embodiment, illustrating the conductive plate at an unclamped position.

The conductive plate 5 is pivotable relative to the casing 2 between a clamped position (see FIG. 11) where the conductive body 52 of the conductive plate 5 is clamped between the first and second batteries 3, 4, and an unclamped position (see FIG. 12) where the second battery 4 is removed from the battery slot 21 and where the conductive body 52 is spaced apart from the first battery 3 for installment or removal of the first battery 3.

The conductive body 52 is made of conductive materials, preferably materials that are not easy to oxidize, such as gold, silver, and nickel, and more preferably a gold-plated metal that has a superior conductivity and a relatively low cost. The mounting portion 51 may be made of the same material of the conductive body 52 and molded with the conductive body 52 as one piece, and may be made of a flexible plastic or a flexible metal.

The conductive body 52 further has four first contacts 61 that are disposed respectively on the first tongues 524 and the third tongues 527, and two second contacts 62 that are disposed respectively on the second tongue 525 and the fourth tongue 528. The numbers of the first and second contacts 61, 62 may vary for different demands. For example, the conductive body 52 of the conductive plate 5 may have only one first contact 61 or only one second contact 62. Moreover, the conductive body 52 of the conductive plate 5 may not be formed with first and second through grooves 523, 526 and the tongues 524, 525, 527, 528, and the first and second contacts 61, 62 may be formed directly on the conductive body 52.

In this embodiment, the conductive body 52 has two through grooves 523, 526 and six tongues 524, 525, 527, 528. However, the numbers of the through grooves 523, 526 and the tongues 524, 525, 527, 528 may vary. The configuration of the through grooves 523, 526 and the tongues 524, 525, 527, 528 enhance the flexibility of the conductive plate 5 to enhance contact between the first contacts 61 and the first battery 3 and contact between the second contacts 62 and the second battery 4.

In this embodiment, the first and second batteries 3, 4 are connected in series, the first contacts 61 are connected to the positive terminal of the first battery 3, and the second contacts 62 are connected to the negative terminal of the second battery 4. However, the first and second batteries 3, 4 may be connected in parallel, e.g., the first and second contacts 61, 62 are connected respectively to the positive terminals of the first and second batteries 3, 4, or connected respectively to the negative terminals of the first and second batteries 3, 4.

In this embodiment, the through grooves 523, 526 are rectangular, the first and second tongues 524, 525 are rectangular and extend in opposite directions, and the third and fourth tongues 527, 528 are rectangular and extend in opposite directions.

While in this embodiment, the electronic device has only two batteries 3, 4 disposed in the battery slot 21, more than two batteries may be employed in other embodiments of this disclosure and arranged in the direction of the axis (L) with a conductive plate 5 being disposed between each adjacent pair of the batteries.

Referring to FIGS. 1, 2, 4 and 5, each first contact 61 is configured as a bulge protruding toward the first battery 3 from the first surface 521. Referring to FIGS. 1, 3, 6 and 7, each second contact 62 is configured as a bulge protruding toward the second battery 4 from the second surface 522. In this embodiment, the conductive plate 5 has a thickness ranging from 0.05 to 0.25 mm, preferably from 0.13 to 0.17 mm. Each of the first and second contacts 61, 62 has a thickness ranging from 0.05 to 0.25 mm, preferably from 0.13 to 0.17 mm. Each of the contacts 61, 62 applies a contact force on a corresponding one of the terminals of the first and second batteries 3, 4 and ranging from 100 to 600 grams, preferably from 200 to 500 grams.

Figure 8:
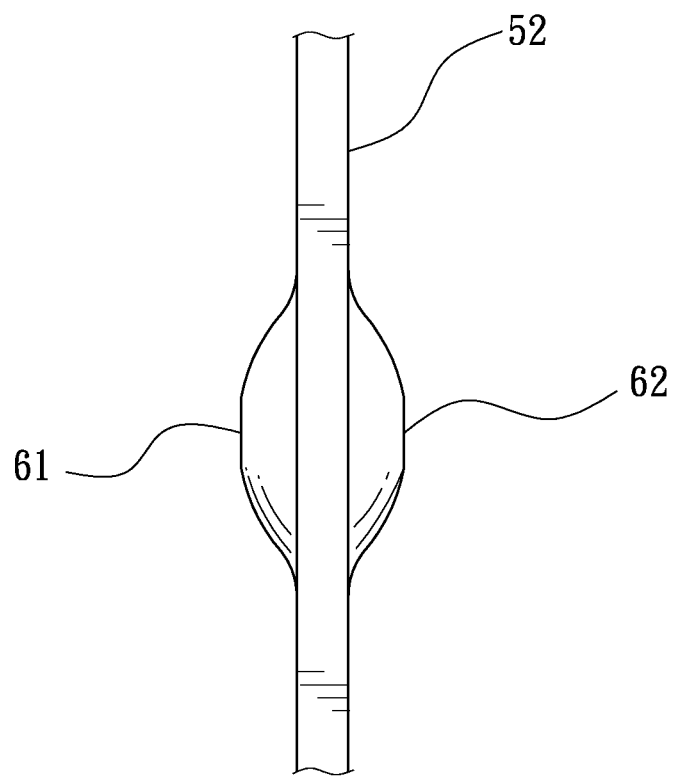
FIG. 8 is a fragmentary side view of a variation of the conductive plate of the embodiment.

Referring to FIGS. 3 and 8, the first and second contacts 61, 62 may be formed by pressing or injection molding, or may be soldered on the first and second surfaces 521, 522 of the conductive body 52.

Figure 9:
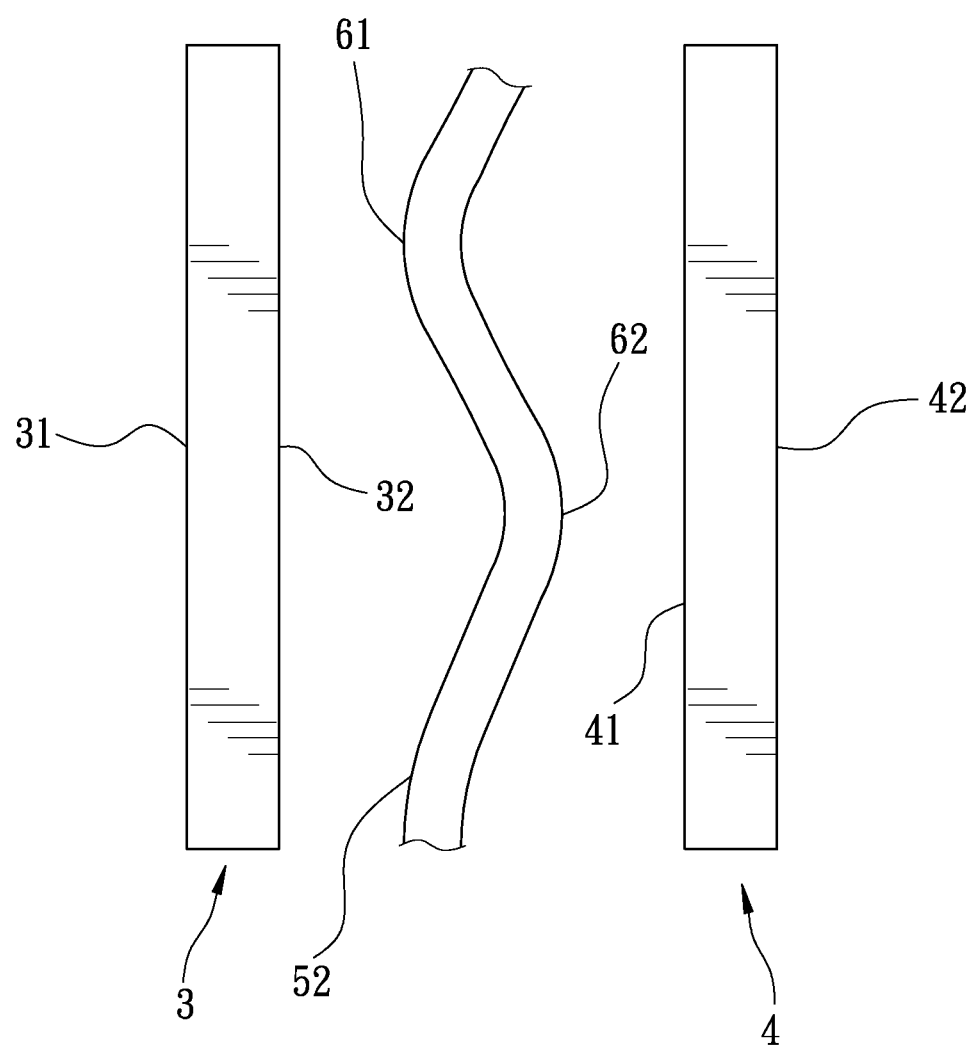
FIG. 9 is a fragmentary side view of another variation of the conductive plate of the embodiment.

Referring to FIG. 9, a variation of the conductive body 52 is a curved plate. The first contact 61 is configured to be a convex portion of the curved plate to contact the first battery 3, and the second contact 62 is configured to be another convex portion of the curved plate to contact the second battery 4.

Figure 10:
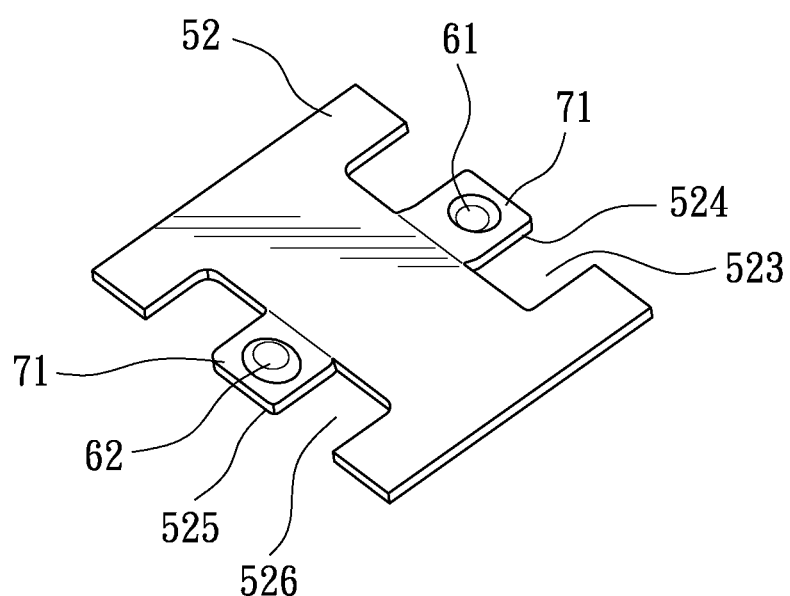
FIG. 10 is a perspective view of still another variation of the conductive plate of the embodiment.

Referring to FIG. 10, another variation of the conductive body 52 is shown. The through grooves 523, 526 are formed respectively in opposite edge portions of the conductive body 52. The tongues 524, 525 extend respectively into the through grooves 523, 526 and are provided respectively with first and second contact 61, 62. Each of the tongues 524, 525 has a free end 71 and a fixed end opposite to the free end 71 connected fixedly to an edge surrounding the corresponding one of the through grooves 523, 526. However, the through grooves 523, 526 can be formed respectively in any edge portions of the conductive body 52, and the numbers of the through grooves 523, 526 and the tongues 524, 525 may vary.

The advantages of this disclosure are as follows:

1. The conductive body 52 of the conductive plate 5 is disposed between the first and second batteries 3, 4, and each of the first and second contacts 61, 62 has a point contact with one of the first electrode ends 32, 41 of the first and second batteries 3, 4. Therefore, dust accumulation on the first electrode ends 32, 41 of the first and second batteries 3, 4 would not easily affect the electrical connection between the conductive plate 5 and the first and second batteries 3, 4.

2. The pivotal connection between the mounting portion 51 of the conductive plate 5 and the mounting groove 23 of the casing 2 provides facility and stability of installment and removal of the batteries 3, 4. During installment of the batteries 3, 4, the conductive body 52 is easily operated to pivot to the unclamped position for the installment of the first battery 3, and then pivot to the clamped position for the installment of the second battery 4 and for being positioned between the first and second batteries 3, 4. During removal of the batteries 3, 4, the conductive body 52 is easily operated to pivot to the unclamped position after the removal of the second battery 4 for the removal of the first battery 3.

3. The configuration of the through grooves 523, 526 and the tongues 524, 525, 527, 528 enhance the flexibility of the conductive plate 5, thereby further enhancing the contacts between the first contacts 61 and the first battery 3 and between the second contacts 62 and the second battery 4.

While the disclosure has been de scribed in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic device comprising:
   a casing formed with a battery slot, and having a mounting groove that is formed in an inner surrounding surface of said casing defining said battery slot;
   positive and negative power output terminals projecting into said battery slot;
   first and second batteries removably disposed in said battery slot, and each having a first electrode end and a second electrode end; and
   a conductive plate clamped removably between said first and second batteries, and having a conductive body and a mounting portion that extends from said conductive body;
   wherein, said first battery, said conductive plate and said second battery are arranged along an extending direction of said battery slot, said first electrode end of said first battery being connected electrically to said first electrode end of said second battery via said conductive plate, said second electrode ends of said first and second batteries being connected electrically and respectively to said positive and negative power output terminals, said conductive body of said conductive plate having at least one contact for contact with one of said first electrode ends of said first and second batteries, said mounting portion of said conductive plate being mounted pivotally into said mounting groove of said casing such that said conductive plate is pivotable relative to said casing between a clamped position where said conductive body is clamped between said first and second batteries, and an unclamped position where one of said first and second batteries is removed from said battery slot and where said conductive body is spaced apart from the other one of said first and second batteries for removal and installment of the other one of said first and second batteries.

2. The electronic device as claimed in claim 1, wherein said conductive body of said conductive plate further has
   a first surface that faces said first battery,
   a second surface that is opposite to said first surface and that faces said second battery, and
   a first contact that is disposed on said first surface and that is connected electrically to said first electrode end of said first battery, said first contact being configured as a bulge that protrudes toward the first battery from said first surface.

3. The electronic device as claimed in claim 2, wherein said conductive body of said conductive plate further has
   a first through groove that extends through said first and second surfaces, and
   a resilient first tongue that has a fixed end connected fixedly to an edge surrounding said first through groove, that has a free end, and that defines a part of said first surface to dispose said first contact.

4. The electronic device as claimed in claim 1, wherein said conductive body of said conductive plate further has
   a first through groove,
   at least one resilient first tongue that is disposed in said first through groove and that has a fixed end connected fixedly to an edge surrounding said first through groove, and
   a resilient second tongue that is disposed in said first through groove, that is spaced apart from said first tongue, and that has a fixed end connected fixedly to said edge surrounding said first through groove.

* * * * *